United States Patent Office 3,450,723
Patented June 17, 1969

3,450,723
3-UREIDO PREGNANES
John H. Fried, Palo Alto, Calif., assignor to Syntex Corporation, Panama, Panama, a corporation of Panama
No Drawing. Filed Aug. 15, 1966, Ser. No. 572,243
Int. Cl. C07c 169/32, 169/34; A61k 17/06
U.S. Cl. 260—397.3                               15 Claims

ABSTRACT OF THE DISCLOSURE

Novel steroids, 3-ureidopregnanes and 3-ureidopregn-4-enes having a keto or hydroxy group at C–20 are prepared by reacting the corresponding 3-amines with an alkali metal isocyanate. These ureido compounds have hormonal properties characteristic of progestational agents.

This present invention relates to novel steroids of the pregnane series possessing a ureido substituent at the 3-position and a process for their preparation. The novel compounds of the present invention may be represented by the following formula:

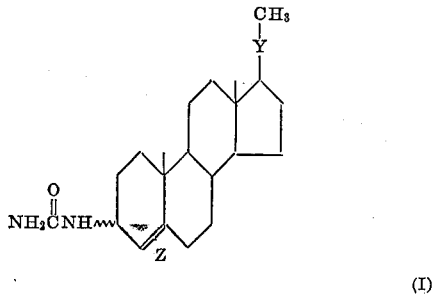

(I)

wherein Y is a carbonyl, β-hydroxymethylene or α-hydroxymethylene group; and

Z is a carbon-carbon single bond or a carbon-carbon double bond, the hydrogen atom at the C–5 position being of either the α or β configuration when Z is a carbon-carbon single bond.

The ureido substituted steroids of the present invention possess valuable pharmological properties. The compounds of Formula I demonstrate hormonal properties characteristic of progestational agents with improved solubilization due to the ureido substituent at the C–3 position. The wavy line indicates both the α and β ureido compounds.

The final compounds of the present invention, as represented by Formula I, are prepared in the following manner. A 3-oximino pregnane, represented by Formula II:

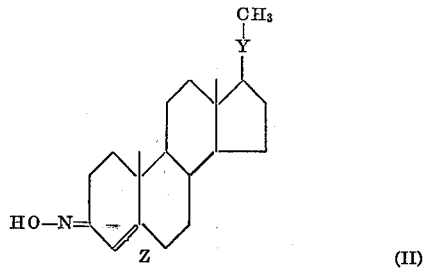

(II)

wherein Y and Z are as defined hereinabove, is reduced catalytically or with an alkali metal—lower alcohol medium or with lithium aluminum hydride in an inert solvent to a corresponding amino compound. Catalytic hydrogenation such as with palladium-on-carbon affords both the 3α and 3β-amino compounds whereas the alkali metal-alcohol reduction, such as with sodium in absolute ethanol or n-butanol, affords predominantly a 3α-amino compound. Reduction with lithium aluminum hydride such as in tetrahydrofuran, affords predominantly the 3β-amino compound.

Representative of the compounds which are reduced in the above fashion are the following:

3-oximino-20,20'-ethylenedioxypregn-4-ene;
3-oximinopregn-4-en-20α-ol;
3-oximinopregn-4-en-20β-ol;
3-oximinopregn-4-en-20-one;
3-oximino-20,20'-ethylenedioxy-5α-pregnane;
3-oximino-5α-pregnan-20α-ol;
3-oximino-5α-pregnan-20β-ol;
3-oximino-5β-pregnan-20α-ol; and
3-oximino-5α-pregnan-20β-ol.

In the practice of the above reduction, for those compounds of Formula I wherein Y is a carbonyl group in the final product, a protecting ethylenedioxy group is introduced prior to reduction and generated subsequently by a conventional hydrolysis such as with p-toluenesulfonic acid in acetone.

A thus-formed 3-amino compound of Formula III:

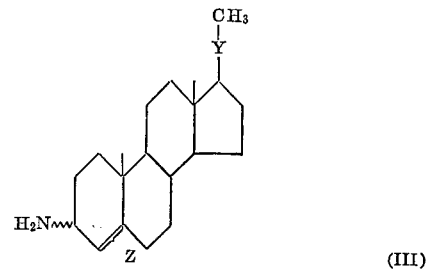

(III)

is allowed to react with an alkali metal isocyanate such as sodium or potassium isocyanate and a weak organic acid such as acetic acid or the like, in a solvent such as aqueous dimethylformamide under reflux conditions or by heating with nitrourea to afford the novel ureido steroids of the present invention, as represented by Formula I.

Representative of the 3α and 3β-amino compounds which are converted to the novel ureido steroids of the present invention, are the following:

3β-amino-20,20'-ethylenedioxypregn-4-ene;
3α-aminopregn-4-en-20α-ol;
3β-amino-20,20'-ethylenedioxy-5α-pregnane; and
3β-amino-20,20'-ethylenedioxy-5β-pregnane.

Subsequent to the formation of the ureido group, the ethylenedioxy group is removed by a conventional hydrolysis such as with p-toluenesulfonic acid in acetone.

The following examples will further illustrate the invention but are not necessarily intended to limit the scope thereof.

EXAMPLE 1

3β-ureido pregnanes

A solution of 1 g. of 3-oximino-20,20'-ethylenedioxypregn-4-ene in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to dryness and recrystallized from ethyl acetate:petroleum ether to yield 3β-amino-20, 20'-ethylenedioxypregn-4-ene.

To a solution of 1 g. of the latter material in 20 ml. of dimethylformamide, 1 ml. of water, and 5 ml. of acetic acid, is added 1 g. of potassium isocyanate. The reaction mixture is heated at reflux for a period of 3 hours and then cooled to room temperature. The reaction mixture is evaporated to dryness and extracted with ethyl acetate to yield 3β-ureido-20,20′-ethylenedioxypregn-4-ene.

A mixture of 0.5 g. of the latter compound in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is recrystallized from ethyl acetate:petroleum ether to yield 3β-ureidopregn-4-en-20-one.

In a similar manner, 3-oximino-20,20′-ethylenedioxy-5β-pregnane and 3-oximino-20,20′-ethylenedioxy-5α-pregnane are converted to the corresponding 3β-ureido derivatives, namely, 3β-ureido-5β-pregnan-20-one; and 3β-ureido-5α-pregnan-20-one.

EXAMPLE 2

3α-ureido pregnanes

A suspension of 0.5 g. of 5% palladium-on-carbon catalyst in 50 ml. of methanol is hydrogenated for 30 minutes. A solution of 2 g. of 3-oximino-20,20′-ethylenedioxypregn-4-ene in 200 ml. of methanol is added and hydrogenated with agitation until the uptake of hydrogen has ceased. The catalyst is removed by filtration and the solution was evaporated and chromatographed on silica eluting with ethyl acetate:benzene to yield 3α-amino-20,20′-ethylenedioxypregn-4-ene which is recrystallized from ethyl acetate:petroleum ether.

A mixture of 1 g. of the above material and 1 g. of nitrourea in 50 ml. of methanol is heated at reflux for a period of one hour. The reaction mixture is cooled and evaporated to yield 3α-ureido-20,20′-ethylenedioxypregn-4-ene which is recrystallized from methanol:benzene.

A mixture of 0.5 g. of the latter compound in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 3α-ureidopregn-4-en-20-one which is recrystallized from acetone:hexane.

In a similar manner, 3-oximino-20,20′-ethylenedioxy-5β-pregnane; and 3-oximino-20,20′-ethylenedioxy-5α-pregnane are converted to the corresponding 3α-ureido derivatives, namely, 3α-ureido-5β-pregnan-20-one; and 3α-ureido-5α-pregnan-20-one.

EXAMPLE 3

3α-ureido pregnanes

To a solution of 1 g. of 3-oximino-20,20′-ethylenedioxypregn-4-ene in 50 ml. of absolute alcohol, is added 2 g. of metallic sodium in small portions. The reaction mixture is heated at reflux for 3 hours, cooled, and then poured into 50 ml. of a crushed ice-water mixture. The reaction mixture is extracted with 20 ml. of ether and the extracts are evaporated to dryness. The residue is recrystallized from ethyl acetate:petroleum ether to yield 3α-amino-20,20′-ethylenedioxypregn-4-ene.

To a solution of 1 g. of the latter material in 20 ml. of dimethylformamide, 1 ml. of water, and 5 ml. of acetic acid, is added 1 g. of potassium isocyanate. The reaction mixture is heated at reflux for a period of three hours and then cooled to room temperature. The reaction mixture is evaporated to dryness and extracted with ethyl acetate to yield 3α-ureido-20,20′-ethylenedioxypregn-4-ene.

A mixture of 0.5 g. of the latter compound in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 3α-ureidopregn-4-en-20-one which is recrystallized from acetone:hexane.

Utilizing the same procedure, 3-oximino-20,20′-ethylenedioxy-5β-pregnane; and 3-oximino-20,20′-ethylenedioxy-5α-pregnane, are converted to 3α-ureido-5β-pregnan-20-one; and 3α-ureido-5α-pregnan-20-one, respectively.

EXAMPLE 4

3β-ureido pregnan-20-ols

A solution of 1 g. of 3-oximinopregn-4-en-20α-ol in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to dryness and recrystallized from ethyl acetate:petroleum ether to yield 3β-aminopregn-4-en-20α-ol.

To a solution of 1 g. of the latter material in 20 ml. of dimethylformamide, 1 ml. of water, and 5 ml. of acetic acid, is added 1 g. of potassium isocyanate. The reaction mixture is heated at reflux for a period of 3 hours and then cooled to room temperature. The reaction mixture is evaporated to dryness and extracted with ethyl acetate to yield 3β-ureidopregn-4-en-20α-ol.

In a similar manner, 3-oximino-5α-pregnan-20β-ol; and 3-oximino-5β-pregnan-20α-ol, are converted to the corresponding 3β-ureido derivatives, namely 3β-ureido-5α-pregnan-20β-ol; and 3β-ureido-5β-pregnan-20α-ol, respectively.

The novel 3-ureido pregnanes of the present invention are progestational agents and are useful in fertility control and the management of various menstrual disorders. In addition, these compounds demonstrate hormonal properties characteristic of anti-androgenic, anti-gonadotrophic and anti-estrogenic agents. The 3-ureido pregnanes of the present invention are administered via usual routes, i.e. orally or parenterally in pharmaceutically acceptable compositions at dosage rates of from 0.5γ to 5 mg./kg./day. However, dosage rates below or above this range can also be used; the most favorable dosage rate and administration route being conditioned upon the purpose for which the compound is administered and the response thereto.

What is claimed is:

1. A compound of the pregnane series having the formula:

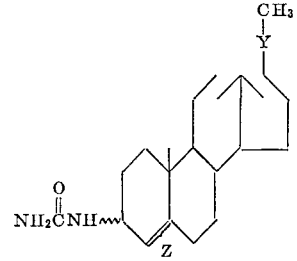

wherein Y is a carbonyl, α-hydroxymethylene or β-hydroxymethylene group; and

Z is a carbon-carbon single bond or a carbon-carbon double bond, the hydrogen atom at the C–5 position being of either the α or β configuration when Z is a carbon-carbon single bond.

2. A compound according to claim 1 wherein the 3-ureido substituent is of the α-configuration.

3. A compound according to claim 2 wherein Z is a carbon-carbon double bond; and Y is a carbonyl group.

4. A compound according to claim 2 wherein Z is a carbon-carbon double bond; and Y is a β-hydroxymethylene group.

5. A compound according to claim 2 wherein Z is a carbon-carbon double bond; and Y is a α-hydroxymethylene group.

6. A compound according to claim 2 wherein Z is a carbon-carbon single bond, the hydrogen atom at the C–5 position being of the α-configuration; and Y is a carbonyl group.

7. A compound according to claim 2 wherein Z is a carbon-carbon single bond, the hydrogen atom at the C–5 position being of a α-configuration; and Y is a β-hydroxymethylene group.

8. A compound according to claim 2 wherein Z is a carbon-carbon single bond, the hydrogen atom at the C–5 position being of a α-configuration; and Y is a α-hydroxymethylene group.

9. A compound according to claim 2 wherein Z is a carbon-carbon single bond, the hydrogen atom at the C–5 position being of the β-configuration; and Y is a carbonyl group.

10. A compound according to claim 2 wherein Z is a carbon-carbon single bond, the hydrogen atom at the C–5 position being of a α-configuration; and Y is a β-hydroxymethylene group.

11. A compound according to claim 2 wherein Z is a carbon-carbon single bond, the hydrogen atom at the C–5 position being of the β-configuration; and Y is a α-hydroxymethylene group.

12. A compound according to claim 1 wherein the 3-ureido substituent is of the β-configuration.

13. A compound according to claim 12 wherein Z is a carbon-carbon double bond; and Y is as defined hereinabove.

14. A compound according to claim 12 wherein Z is a carbon-carbon single bond, the hydrogen atom at the C–5 position being of the α- configuration, and Y is as defined above.

15. A compound according to claim 12 wherein Z is a carbon-carbon single bond, the hydrogen atom at the C–5 position being of the β-configuration, and Y is as defined hereinabove.

References Cited
UNITED STATES PATENTS

| | | | |
|---|---|---|---|
| 3,053,861 | 9/1962 | Burg | 260—397.3 |
| 3,325,517 | 6/1967 | Meyer et al. | 260—397 |

LEWIS GOTTS, *Primary Examiner.*

E. G. LOVE, *Assistant Examiner.*

U.S. Cl. X.R.

260—239.55, 397.5, 999

UNITED STATES PATENT OFFICE
CERTIFICATE OF CORRECTION

Patent No. 3,450,723　　　　　　　　　　Dated June 17, 1969

Inventor(s) John H. Fried

It is certified that error appears in the above-identified patent and that said Letters Patent are hereby corrected as shown below:

Column 4, lines 50-61, the portion of the formula reading

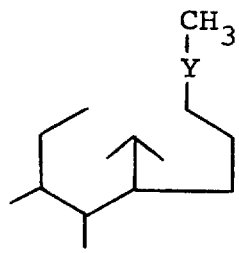　　should read　　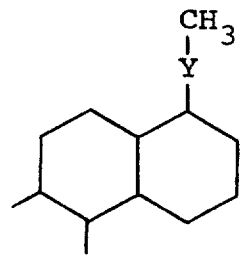

Column 5, line 22, in the term "α-configuration", the "α" should be -- β --.

SIGNED AND
SEALED

JUL 28 1970

(SEAL)
Attest:

Edward M. Fletcher, Jr.
Attesting Officer

WILLIAM E. SCHUYLER, JR.
Commissioner of Patents